US011210572B2

(12) United States Patent
Divakaran et al.

(10) Patent No.: US 11,210,572 B2
(45) Date of Patent: Dec. 28, 2021

(54) ALIGNING SYMBOLS AND OBJECTS USING CO-ATTENTION FOR UNDERSTANDING VISUAL CONTENT

(71) Applicant: SRI International, Menlo Park, CA (US)

(72) Inventors: Ajay Divakaran, Monmouth Junction, NJ (US); Karan Sikka, Lawrenceville, NJ (US); Karuna Ahuja, San Francisco, CA (US); Anirban Roy, San Francisco, CA (US)

(73) Assignee: SRI International, Menlo Park, CA (US)

( * ) Notice: Subject to any disclaimer, the term of this patent is extended or adjusted under 35 U.S.C. 154(b) by 62 days.

(21) Appl. No.: 16/717,497

(22) Filed: Dec. 17, 2019

(65) Prior Publication Data

US 2020/0193245 A1 Jun. 18, 2020

Related U.S. Application Data

(60) Provisional application No. 62/780,474, filed on Dec. 17, 2018.

(51) Int. Cl.
*G06K 9/62* (2006.01)
*G06K 9/46* (2006.01)
(Continued)

(52) U.S. Cl.
CPC ......... *G06K 9/6289* (2013.01); *G06K 9/4609* (2013.01); *G06K 9/629* (2013.01);
(Continued)

(58) Field of Classification Search
CPC .... G06K 9/6289; G06K 9/4609; G06K 9/629; G06K 9/66; G06K 9/726; G06N 3/08
See application file for complete search history.

(56) References Cited

U.S. PATENT DOCUMENTS

2016/0358632 A1* 12/2016 Lakhani ............... H04N 9/8715
2018/0005037 A1* 1/2018 Smith, IV ............. G10L 15/26
2021/0117665 A1* 4/2021 Simantov ............. G06Q 30/04

OTHER PUBLICATIONS

Ye et al. "Advise: Symbolism and external knowledge for decoding advertisements." Proceedings of the European Conference on Computer Vision (ECCV). 2018. (Year: 2018). (Year: 2018).*
(Continued)

*Primary Examiner* — Fayyaz Alam
(74) *Attorney, Agent, or Firm* — Moser Taboada (57) ABSTRACT

A method, apparatus and system for understanding visual content includes determining at least one region proposal for an image, attending at least one symbol of the proposed image region, attending a portion of the proposed image region using information regarding the attended symbol, extracting appearance features of the attended portion of the proposed image region, fusing the appearance features of the attended image region and features of the attended symbol, projecting the fused features into a semantic embedding space having been trained using fused attended appearance features and attended symbol features of images having known descriptive messages, computing a similarity measure between the projected, fused features and fused attended appearance features and attended symbol features embedded in the semantic embedding space having at least one associated descriptive message and predicting a descriptive message for an image associated with the projected, fused features.

20 Claims, 6 Drawing Sheets

(51) Int. Cl.
  G06K 9/72     (2006.01)
  G06N 3/08     (2006.01)
  G06K 9/66     (2006.01)
(52) U.S. Cl.
  CPC .............. *G06K 9/66* (2013.01); *G06K 9/726* (2013.01); *G06N 3/08* (2013.01)

(56) References Cited

OTHER PUBLICATIONS

P. Anderson, X. He, C. Buehler, D. Teney, M. Johnson, S. Gould, and L. Zhang. Bottom-up and top-down attention for image captioning and visual question answering, preprint arXiv:1707.07998, 2017. 2, 3.

A. Das, H. Agrawal, L. Zitnick, D. Parikh, and D. Batra. Human attention in visual question answering: Do humans and deep networks look at the same regions? Computer Vision and Image Understanding, 163:90-100, 2017.2.

T. Durand, N. Thome, and M. Cord. Weldon: Weakly supervised learning of deep convolutional neural networks. In Proceedings of the IEEE Conference on Computer Vision and Pattern Recognition, pp. 4743-4752, 2016.2.

Z. Hussain, M. Zhang, X. Zhang, K. Ye, C. Thomas, Z. Agha, N. Ong, and A. Kovashka. Automatic understanding of image and video advertisements. In 2017 IEEE Conference on Computer Vision and Pattern Recognition (CVPR), pp. 1100-1110. IEEE, 2017. 1, 2, 3.

R. Kiros, R. Salakhutdinov, and R. S. Zemel. Unifying visualsemantic embeddings with multimodal neural language models. arXiv preprint arXiv:1411.2539, 2014. 1, 2, 3.

R. Krishna, Y. Zhu, O. Groth, J. Johnson, K. Hata, J. Kravitz, S. Chen, Y. Kalantidis, L.-J. Li, D. A. Shamma, et al. Visual genome: Connecting language and vision using crowdsourced dense image annotations. International Journal of Computer Vision, 123(1):32-73, 2017. 1.

H. Nam, J.-W. Ha, and J. Kim. Dual attention networks for multimodal reasoning and matching. arXiv preprint arXiv:1611.00471, 2016. 2.

A. Roy and S. Todorovic. Combining bottom-up, top-down, and smoothness cues for weakly supervised image segmentation. 2.

S. Sharma, R. Kiros, and R. Salakhutdinov. Action recognition using visual attention. arXiv preprint arXiv: 1511.04119, 2015. 2.

E. W. Teh, M. Rochan, and Y. Wang. Attention networks for weakly supervised object localization. In BMVC, 2016. 2.

K. Xu, J. Ba, R. Kiros, K. Cho, A. Courville, R. Salakhudinov, R. Zemel, and Y. Bengio. Show, attend and tell: Neural image caption generation with visual attention. In International Conference on Machine Learning, pp. 2048-2057, 2015. 2.

K. Ye and A. Kovashka. Advise: Symbolism and external knowledge for decoding advertisements. arXiv preprint arXiv:1711.06666, 2017. 1, 2, 3.

\* cited by examiner

| METHOD | BOX PROPOSALS | ATT. | CO-ATT. | MEAN RANK |
|---|---|---|---|---|
| VSE | | | | 7.79 |
| VSE-ATT | | ✓ | | 8.32 |
| VSE-P | ✓ | | | 7.74 |
| VSE-P-ATT | ✓ | ✓ | ✓ | 7.35 |
| VSE-COATT | ✓ | ✓ | ✓ | 6.68 |
| VSE-COATT2 | ✓ | ✓ | ✓ | 6.58 |
| VSE-COATT-WT | ✓ | ✓ | ✓ | 6.77 |
| VSE-COATT2-WT | ✓ | ✓ | ✓ | 6.75 |

ALIGNING SYMBOLS AND OBJECTS USING CO-ATTENTION FOR UNDERSTANDING VISUAL CONTENT

CROSS-REFERENCE TO RELATED APPLICATIONS

This application claims priority to and the benefit of U.S. Provisional Patent Application Ser. No. 62/780,474, filed Dec. 17, 2018 which is incorporated herein by this reference in its entirety.

FIELD

Embodiments of the present principles generally relate to understanding visual content, and more particularly, to methods, apparatuses, and systems for aligning symbols and objects using co-attention for understanding visual content.

BACKGROUND

While current vision approaches can successfully address object and scene-centric interpretations of an image/visual content, deeper subjective interpretation, such as rhetoric, symbolism, and the like, remain challenging and has drawn limited attention from the vision community.

Understanding visual content including sentiment, symbolism and the like, such as visual advertisement, is a special case of visual content analysis. That is for example, understanding advertisements demands reasoning beyond objects and requires deeper subjective interpretation, such as rhetoric, symbolism, and the like. In most cases, advertisements are designed to convey a specific message by carefully organizing objects and ad messages. Therefore, understanding both the symbolic and sentimental attributes of the depicted objects and ad messages is required for understanding and decoding an advertisement.

SUMMARY

Embodiments of methods, apparatuses and systems for understanding visual content are disclosed herein.

In some embodiments in accordance with the present principles, a method for understanding visual content includes determining at least one region proposal for an image of the visual content, attending at least one corresponding symbol of the proposed image region of the visual content, attending at least one portion of the proposed image region using information regarding the attended, at least one corresponding symbol, extracting appearance features of the attended, at least one portion of the proposed image region using a neural network, fusing the appearance features of the attended, at least one portion of the proposed image region and features of the attended, at least one corresponding symbol, projecting the fused features into a semantic embedding space having been trained using fused attended appearance features and attended symbol features of images having known descriptive messages, computing a similarity measure between the projected, fused features and fused attended appearance features and attended symbol features embedded in the semantic embedding space having at least one associated descriptive message and predicting a descriptive message for an image associated with the projected, fused features by determining a nearest embedded, fused attended appearance features and attended symbol features to the projected, fused features of the image in the semantic embedding space based on the similarity measures computed for the projected, fused features of the image.

In some embodiments in accordance with the present principles, a method for creating a semantic embedding space for determining a descriptive message for understanding images of visual content includes for each of a plurality of images of the visual content having known descriptive messages, determining at least one region proposal for the image, attending at least one corresponding symbol of the proposed image region of the visual content, attending at least one portion of the image region using information regarding the attended, at least one corresponding symbol, extracting appearance features of the attended, at least one portion of the proposed image region, fusing the appearance features of the attended, at least one portion of the proposed image region and features of the attended, at least one corresponding symbol, creating a first feature vector representation of the fused features, encoding the words of the known descriptive message into a sentence, creating a second feature vector representation of the sentence, and semantically embedding the first feature vector representation and the second feature vector representation in a semantic embedding space such that embedded feature vector representations that are related are closer together in the semantic embedding space than unrelated feature vector representations.

In some embodiments in accordance with the present principles, an apparatus for visual content understanding of an image includes a region proposal module determining at least one region proposal for an image of the visual content, an attention module attending at least one corresponding symbol of the proposed image region of the visual content and attending at least one portion of the proposed image region using information regarding the attended, at least one corresponding symbol, a feature detection module extracting appearance features of the attended, at least one portion of the proposed image region using a neural network, a modality fusion module fusing the appearance features of the attended, at least one portion of the proposed image region and features of the attended, at least one corresponding symbol, an embedding module projecting the fused features into a semantic embedding space having been trained using fused attended appearance features and attended symbol features of images having known descriptive messages, computing a similarity measure between the projected, fused features and fused attended appearance features and attended symbol features embedded in the semantic embedding space having at least one associated descriptive message and predicting a descriptive message for an image associated with the projected, fused features by determining a nearest embedded, fused attended appearance features and attended symbol features to the projected, fused features of the image in the semantic embedding space based on the similarity measures computed for the projected, fused features of the image.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for aligning symbols and objects in images using co-attention and performing a multi-modal embedding of the aligned objects and candidate messages to establish a correspondence for understanding visual content. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to understanding visual advertisements, such teachings should not be considered limiting. Embodiments in accordance with the present principles can be implemented for understanding other types of visual content within the concepts of the present principles. In addition, although embodiments of the present principles will be described primarily with respect to aligning symbols in the form of texts, and objects of images, embodiments in accordance with the present principles can be implemented using symbols comprising other forms, such as audio, as further described herein.

Embodiments in accordance with the present principles provide methods, apparatuses and systems for aligning symbols and objects of image regions using co-attention and performing a multi-modal embedding of fused symbol/object pairs and candidate messages to establish a correspondence for understanding visual content. In some embodiments in accordance with the present principles, multi-modal embeddings in a common geometric space of objects of proposed image regions and candidate messages are implemented to establish a correspondence between the objects of proposed image regions and the candidate messages. In some embodiments, during image embedding, an attention mechanism is relied upon to associate image regions with corresponding symbols. Convolutional features from image regions are aggregated, guided by the attention process to perform a fused embedding. In some embodiments the candidate messages are featurized through a long, short-term memory network (LSTM). In some embodiments, multi-hop co-attention is implemented, which iteratively refines the bi-directional attention between objects of an image region and symbols to ensure precise embedding of the modalities, which summarizes information from the multiple attended vectors to compute similarity with a candidate message. In some embodiments, a max-margin loss function is implemented to enforce a matching score of an image-symbol pair to be higher with true sentences and vice-versa.

For example, in some embodiments for addressing the problem of advertisement (ad) understanding given an ad image (e.g., ad of a motorbike), a goal is to determine an appropriate message (e.g., 'I should buy the bike as it looks cool') that describes the purpose of the ad while considering symbols (expressed in the ad. In some embodiments in accordance with the present principles, candidate messages include human-generated statements obtained from annotators asked to answer questions about an ad such as "I should do this because". During image embedding, an attention mechanism associates feature vectors of proposed image regions of the ad with co-occurring symbols. Convolutional features from the proposed image regions of the ad are then aggregated, guided by the attention mechanism, to perform image embedding. That is, in some embodiments in accordance with the present principles, a multi-modal embedding of features of proposed regions of the ad, in some embodiments guided by attention determined using symbols, and candidate messages determined for the ad is performed to establish a correspondence between the features of proposed regions of the ad and the candidate messages.

In embodiments in accordance with the present principles, a symbol can include any stream of information co-occurring with a proposed image region. For example, in some embodiments a symbol can include text from a curated list of, for example, 53 symbols (e.g., 'speed', 'exciting', 'cool') expressed in the ad. More specifically, in some embodiments datasets used to train an embedding space in accordance with the present principles include a list of symbols (e.g., 53 symbols in datasets used in an experiment described below) associated with objects included in the datasets. Alternatively or in addition, in some embodiments an optional pre-trained trained detector can be included for detecting symbols in images related to objects of an image. In such embodiments, a proposed image region can be considered a still image and a multi-hop attention mapping between the still image and the text in accordance with the present principles can be applied to produce a final mapping between the text and image proposals for each of the still images that constitute the video. A further analysis step (described below) can then exploit such mapping to detect events during, for example, an image search. Similarly, in some embodiments in accordance with the present principles, a symbol can include audio from an audio stream co-occurring with the video stream. In such embodiments, multi-hop attention in accordance with the present principles can be implemented to establish mappings between the audio and the image proposals. For example, in such embodiments a voice could be mapped to a speaker's face in the video as a result of the multi-hop mapping. In accordance with the present principles, co-occurring data that includes a natural correspondence between at least two streams of information is mapped in accordance with the present principles.

Figure 1:
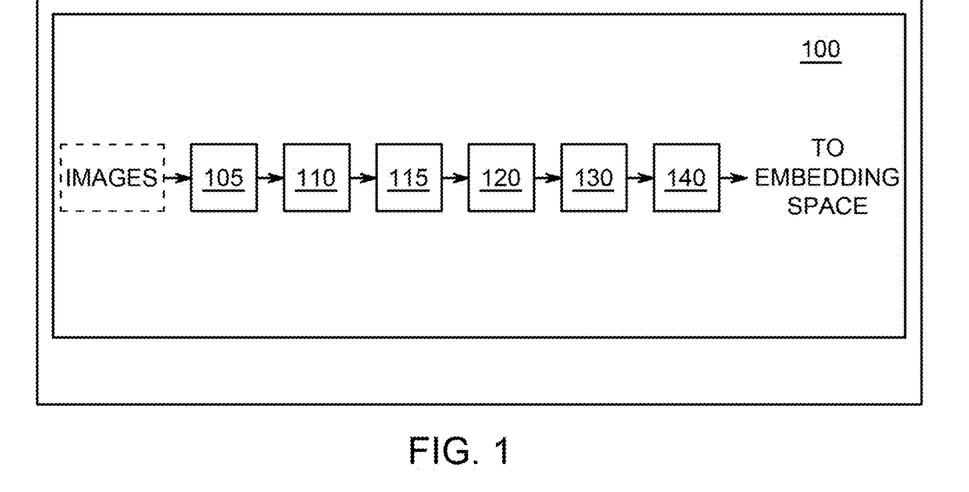
FIG. 1 depicts a high-level block diagram of a visual content understanding system in accordance with an embodiment of the present principles.

FIG. 1 depicts a high-level block diagram of a visual content understanding system 100 in accordance with an embodiment of the present principles. The content understanding system 100 of FIG. 1 illustratively comprises a region proposal module 105, an attention module 110, a feature detection module 115, a modality fusion module 120, a long, short term memory network (LSTM) 130, and an embedding module 140.

As depicted in FIG. 1, embodiments of a visual content understanding system can be implemented in a computing device 500 (described in greater detail in FIG. 5) in accordance with the present principles. That is, in some embodiments, images and videos that can be used to train an embedding space in accordance with the present principles can be received by the content understanding system 100 from the computing device 500. In addition, images and videos for which visual content understanding is to be performed by a visual content understanding system, such as the content understanding system 100 of FIG. 1 in accordance with embodiments of the present principles, can be received by the content understanding system 100 from the computing device 500. Results of the visual content understanding in accordance with the present principles can be presented to a user using an output device of the computing device 500, such as a display, a printer or any other form of output device.

In the content understanding system 100 of FIG. 1, the region proposal module 105 proposes object regions of an image of the visual content. For example, in some embodiments, the region proposal module 105 proposes image regions (e.g., image boxes) of an ad image. In some embodiments and as described below, the region proposal module 105 can implement EdgeBoxes for extracting object proposals of images of the visual content.

In the content understanding system 100 of FIG. 1, the feature detection module 115 can detect symbols associated with images in the proposed image region(s). That is, in some embodiments, symbols associated with each proposed image region can be predetermined and provided for use with a visual content understanding system in accordance with the present principles. In some embodiments, such symbol information can be included with the visual content as metadata. Alternatively or in addition, in some embodiments, such information can be provided to the visual content understanding system 100 via, for example, an input device associated with the computing device 500. Alternatively or in addition, in some embodiments, the feature detection module 115 of the present principles can include an optional pre-trained detector for detecting symbols in images.

In the content understanding system 100 of FIG. 1, the attention module 110 guides an alignment between the input modalities (e.g., image symbols and image region proposals) by predicting attention regions, which in some embodiments implements an alternating attention from a set of image-level symbols to image regions and vice-versa. That is, the attention module 110 can attend features of at least one of the symbols in the proposed image region. In some embodiments, symbols can be weighted and a determination of which symbols to attend can be based on the weight of the symbols. Alternatively or in addition, in some embodiments a determination of which symbols to attend can be random.

Once the symbol(s) of the proposed image region are attended, the attention module 110 can determine for which portions or features of the proposed image region to perform attention based on information regarding the attended symbols. More specifically, because a symbol is related to objects of, for example, a proposed region of an image, at least by describing at least one object of the proposed region of the image, information regarding the attended symbols at least implicitly and sometimes explicitly affects how the proposed region of the image will be attended. This is sometimes referred to as co-attention.

The feature detection module 115 can then extract image features of the attended image region. In some embodiments, the feature detection module 115 comprises a convolutional neural network (CNN) trained to extract visual features from a subject image/stream. Alternatively or in addition, in some embodiments other neural networks, such as recurrent neural networks and graph neural networks, as well as other network architectures, such as support vector machines, can be used to extract visual features from an input image/stream (described in further detail below).

In some embodiments, the attention module 110 of the content understanding system 100 determines multi-hop attention between image regions and symbols. In such embodiments, the attention is computed iteratively while attention estimation in a current step is influenced by the attention from a previous step (described in further detail below).

In the system 100 of FIG. 1, the fusion module 120 fuses information from the attended image and symbol pairs, which in some embodiments include image and symbol pairs from different iterations (described in further detail below). The LSTM 130 of the system 100 of FIG. 1, encodes a sentence from the words of the candidate message(s).

The embedding module 140 of the system 100 of FIG. 1 pools the data from the attended and fused features communicated from the modality fusion module 120 and sentences from the LSTM 130 to generate image embeddings in a semantically aware embedding space (250 of FIG. 2), which can then be used to retrieve matches for a query image. In some embodiments, spatial pyramid pooling (SPP) is used in the embedding module 140 since SPP does not include any trainable parameters. In some embodiments, SPP with pooling sizes of [4; 3; 2; 1] are implemented and the feature maps from all layers are concatenated to produce a final embedding. Alternatively or in addition, NetVLAD pooling can be implemented in the embedding module 140. NetVLAD, is a new generalized VLAD layer, in-spired by the "Vector of Locally Aggregated Descriptors" image representation commonly used in image retrieval. The layer is readily pluggable into any CNN architecture. In some embodiments, embeddings performed by the embedding module 140 can be L2-normalized and scaled, for example, by a factor of 10.

In some embodiments, the embedding module 140 determines respective feature vector representations of the fused, attended images and symbols, which in some embodiments includes fused images and symbols from the different iterations. Similarly, the embedding module 140 can determine respective feature vector representations of the encoded sentence from the LSTM network 130. The embedding module 140 embeds the feature vectors into a semantically aware embedding space. That is, in some embodiments, initially, a geometric space, such as a semantic embedding space, is built (trained) by embedding feature vectors of images and associated symbols, fused in accordance with the present principles, and the sentences from the LSTM module 130 into the semantic embedding space.

Specifically, in some embodiments a semantic embedding space can be trained by, for each of a plurality of images of the visual content having known descriptive messages, by first determining at least one region proposal for the image. Subsequently, at least one corresponding symbol of the proposed image region of the visual content is attended. In addition, at least one portion of the image region is attended using information regarding the attended, at least one corresponding symbol. For each of the plurality of images of the visual content having known descriptive messages, appearance features of the attended, at least one portion of the proposed image region are extracted. The appearance features of the attended, at least one portion of the proposed image region and features of the attended, at least one corresponding symbol are then fused and a first feature vector representation of the fused features is created. For each of the plurality of images of the visual content having known descriptive messages, the words of the known descriptive message are encoded into a sentence and a second feature vector representation of the sentence is created. The first feature vector representation and the second feature vector representation are semantically embedded in a semantic embedding space. In some embodiments to train the semantic embedding space, a max-margin-based triplet ranking loss function is implemented. The max-margin-based triplet ranking loss function optimizes the embedding space such that embedded feature vector representations that are related are closer together in the semantic embedding space than unrelated feature vector representations.

Figure 2:
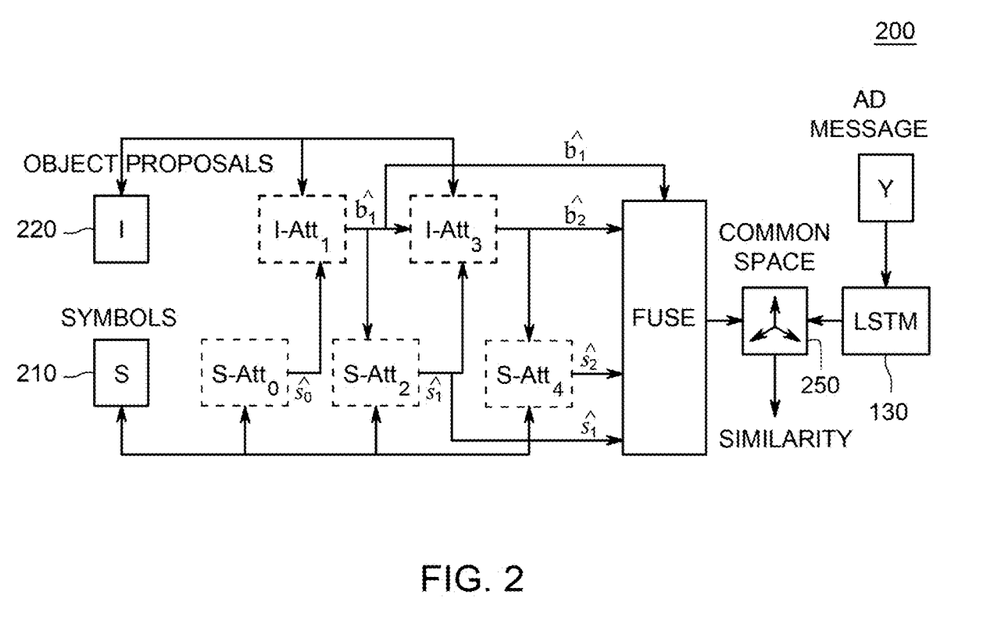
FIG. 2 depicts a functional diagram of the visual content understanding system of FIG. 1 in accordance with an embodiment of the present principles.

FIG. 2 depicts a functional diagram 200 of the visual content understanding system 100 of FIG. 1 in accordance with an embodiment of the present principles. The embodiment of FIG. 2 depicts an embodiment of the present principles which implements multiple iterations of symbol and image attention. As depicted in FIG. 2, in an initial iteration attention is determined for a symbol(s) 210 in a proposed region of a subject ad image at S-Att$_0$. The attended symbol(s) are then used to determine an attention for the proposed region (e.g., object proposal) 220 at I-Att$_1$. As depicted in FIG. 2, the attention process continues for multiple iterations including S-Att$_2$, I-Att$_3$, and S-Att$_4$, in which results of each previous iteration is used for determining a subsequent iteration.

Figure 7:
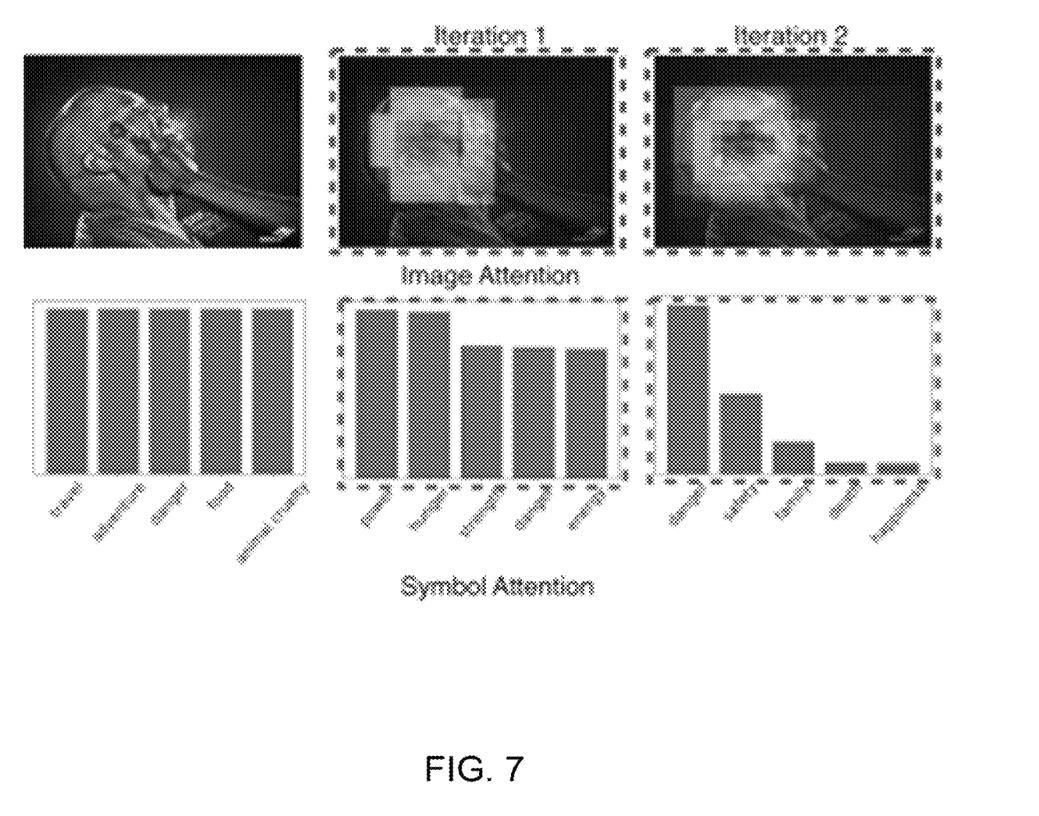
FIG. 7 graphically depicts the results of two iterations of symbol and image attention for an ad image in accordance with the present principles.

FIG. 7 depicts the results of two iterations of symbol and image attention for an ad image in accordance with the present principles for proposed regions of an ad image corresponding to road safety including the symbols of power, hunger, danger and safety. As depicted in FIG. 7, the multiple iterations of symbol and image attention implemented in FIG. 2, both identifies as well as refines symbol and image attention in multiple iterations. For example, in the ad image corresponding to road safety of FIG. 7, the symbol attention in the second hop is refined by shifting attention from unrelated symbols like 'power' and 'hunger' to relevant symbols such as 'danger' and 'safety' over the course of multi-hop iterations.

As depicted in FIG. 2, the information from the attended image and symbol pairs are fused. In some embodiments, a first vector is then determined for the attended, fused image and symbol pairs and the first vector is embedded in the common embedding space 250.

As further depicted in FIG. 2, a candidate ad message(s) is encoded in the LSTM 130 and a second vector is determined for the encoded sentence. The vector determined for the candidate ad message(s) is embedded in the common embedding space 250. In some embodiments in accordance with the present principles, a candidate message(s) can be determined for each proposed object region of an ad image, for multiple proposed object regions of an ad image or for an entire ad image depending on the granularity desired in the common embedding space 250.

A common embedding space such as the common embedding space 250 of FIG. 2 can be trained as described herein using a plurality of ad images, associated symbols and candidate ad messages, such that, after training, the embedding space 250 can be used to determine candidate ad messages for ad images for which a candidate ad message is desired. More specifically, after training of the common embedding space, attended, fused vectors of image regions and associated symbols of an ad image, determined in accordance with the present principles as described herein, are projected into the common embedding space, in one embodiment, using linear projection. A similarity between the attended, fused vectors and a respective candidate ad message in the common embedding space is then determined. For example, in some embodiments, a cosine similarity function is used to determine a similarity between the attended, fused vectors of the subject ad image and an ad message in the common embedding space. As such, an ad message can be determined for ad images in accordance with the present principles.

For example in more detail, in some embodiments in accordance with the present principles, an ad image is denoted as $I \in \mathcal{R}^{M \times N \times 3}$ and the given ground-truth candidate ad messages as $Y=\{y_j\}_{j=1}^{N_m}$, which is a sequence of words. An embedding is used to represent each word and an LSTM is used to encode a sentence, which is denoted as $\psi(y_j) \in R^{D_3}$. Object proposals, denoted as $\{b_i\}_{i=1}^{N}$, $b_i \in \mathcal{R}^4$, are used to attend to salient image regions instead of equally sized grids.

A curated list of 53 symbols, denoted as $Z=\{z_k\}_{k=1}^{K}$, $Z_k \in \mathcal{R}^{D_1}$, are encoded using, in some embodiments, $D_1$ dimensional GloVe vector. It is also assumed that the symbols ($z_k$) include scores ($p_k$). In some embodiments the scores ($p_k$) are provided by a human/user or are predicted using a convolutional neural network (CNN).

In some embodiments, a separate CNN is used to extract features from each bounding box, bi, of the object proposals and the features can be denoted as $\phi(b_i) \in \mathcal{R}^{D_2}$. The attended vector for symbols (denoted as $\widehat{z_0}$) is initialized according to equation one (1), which follows:

$$\widehat{z_0} = \frac{1}{k} \sum z_k. \qquad (1)$$

The raw attention scores for the region proposals of the ad image, $b_i$, are determined by using the attended symbol vector, $\widehat{z_0}$, as shown below with respect to equations two (2) and three (3). In some embodiments, a softmax function is implemented to normalize the attention scores (denoted as $\alpha_i^I$) as reflected in equation two (2), which follows. In some embodiments, the attended vector, $f\widehat{b_1}$, for the image regions is determined according to equation three (3), which follows:

$$\alpha_i^I = \text{softmax}(\tanh(\widehat{Z_0}^T W^T \phi(b_i))) \quad (2)$$

$$\widehat{b_1} = \Sigma \alpha_i^I \phi(b_i), \quad (3)$$

where $W \in D_2 \times D_1$ is used to project visual features to the symbol space. In the equations herein, a number subscript is used to denote the iteration index for a multi-hop version of embodiments of the present principles.

In ad understanding, image regions may be associated with multiple symbols. As such, the standard top-down attention may get confused due to the many-to-many mapping between image regions and image labels. To address this issue, co-attention can be used as described above to implement an alternating attention from a set of image-level symbols to image regions and vice-versa. Moreover, multi-hop attention between image regions and symbols can be implemented as described above. In such a case, the attention is computed iteratively while attention estimation in a current step is influenced by the attention from a previous step. For example, in some embodiments which include multiple iterations, similar operations as described above with reference to equations (2) and (3) can be used to compute attention, $\alpha_k^z$, for symbol $z_k$ using a previously attended image vector, $b_l$, in accordance with equations four (4) and five (5), which follow:

$$\alpha_k^z = \text{softmax}(\tanh(z_k^T W^T \widehat{b_1})) \quad (4)$$

$$\widehat{Z_1} = \Sigma \alpha_k^z p_k z_k. \quad (5)$$

Known symbol probabilities (scores) are used to weight the attention maps so as to focus on symbols present in a subject image. In some embodiments, the final features for visual and symbol modalities are obtained by fusing the attended vectors at different iterations using an addition operation according to equation six (6), which follows:

$$f_{IZ} = \Sigma_t W_T \widehat{b_t} + \widehat{Z_t} \quad (6)$$

The attended, fused vectors are projected into the common embedding space, in one embodiment, using linear projection. Alternatively or in addition, in some embodiments in accordance with the present principles fused vectors can be projected into the common embedding space using non-linear projection techniques, such as hyperbolic projection. A similarity between the attended, fused vectors and a respective ad message is then determined. For example, in some embodiments, a cosine similarity function is used to determine a similarity, $S_l$, between the attended, fused vectors, $f_{IZ}$, and an lth ad message, $y_l$.

In some embodiments in accordance with the present principles, a max-margin loss function is implemented to enforce the matching score of an image-symbol pair to be higher with true sentences and vice-versa. In some embodiments, loss for a training sample pair I,Z, with ground-truth ad messages, Y, can be defined according to equation seven (7), which follows:

$$\mathcal{L}(I,Z,Y,\theta) = \Sigma_{y_j \in Y} \Sigma_{y_l \notin Y} \max(0, m - S_{ij} + S_{il}). \quad (7)$$

Figure 3:
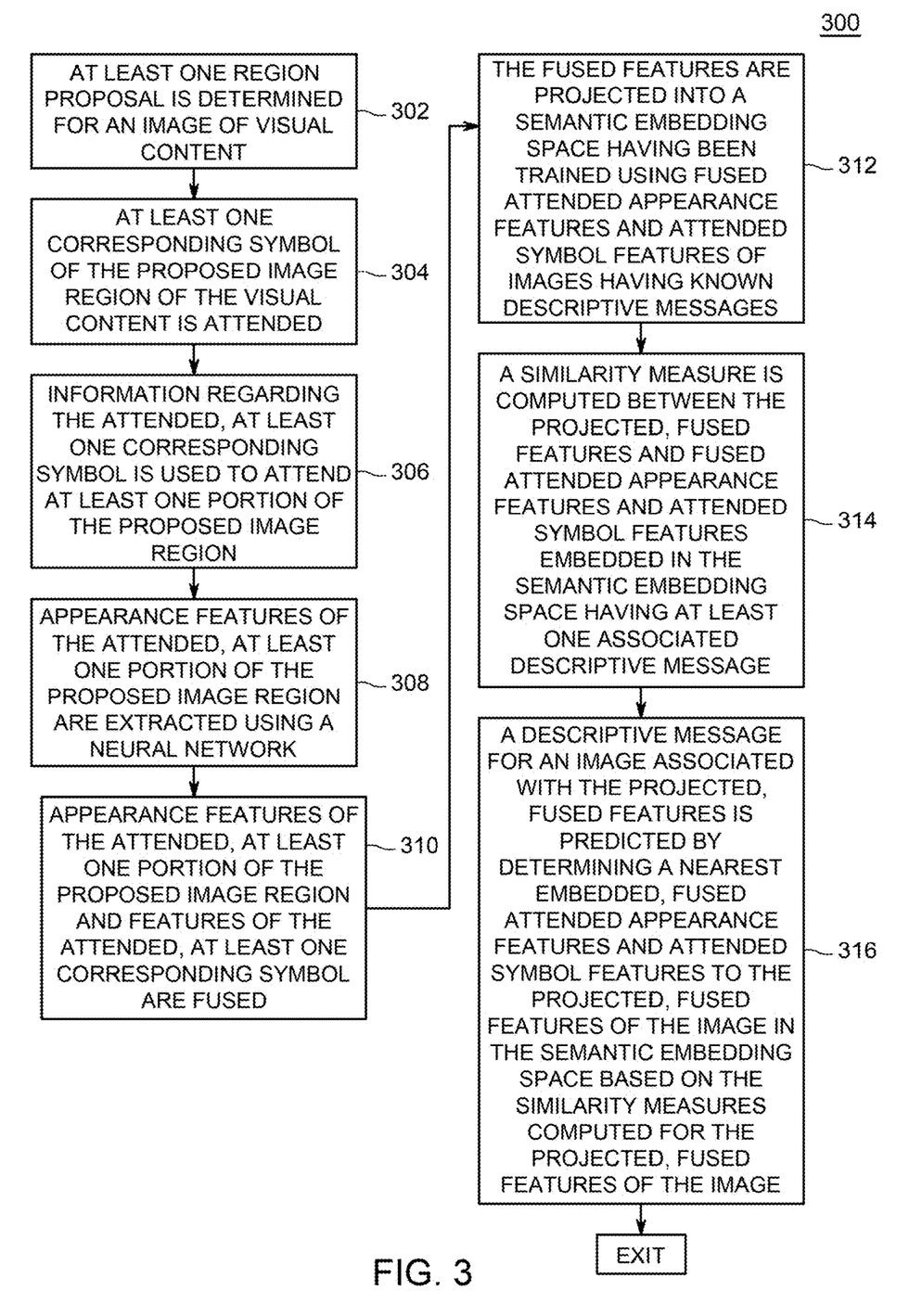
FIG. 3 depicts a flow diagram of a method for understanding visual content in accordance with an embodiment of the present principles.

FIG. 3 depicts a flow diagram of a method 300 for understanding visual content in accordance with an embodiment of the present principles. The method 300 begins at 302 during which at least one region proposal is determined for an image of the visual content. The method 300 can proceed to 304.

At 304, at least one corresponding symbol of the proposed image region of the visual content is attended. The method 300 can proceed to 306.

At 306, information regarding the attended, at least one corresponding symbol is used to attend at least one portion of the proposed image region. The method 300 can proceed to 308.

At 308, appearance features of the attended, at least one portion of the proposed image region are extracted using a neural network. The method 300 can proceed to 310.

At 310, appearance features of the attended, at least one portion of the proposed image region and features of the attended, at least one corresponding symbol are fused. The method 300 can proceed to 312.

At 312, the fused features are projected into a semantic embedding space having been trained using fused attended appearance features and attended symbol features of images having known descriptive messages. The method 300 can proceed to 314.

At 314, a similarity measure is computed between the projected, fused features and fused attended appearance features and attended symbol features embedded in the semantic embedding space having at least one associated descriptive message. The method 300 can proceed to 316.

At 316, a descriptive message for an image associated with the projected, fused features is predicted by determining a nearest embedded, fused attended appearance features and attended symbol features to the projected, fused features of the image in the semantic embedding space based on the similarity measures computed for the projected, fused features of the image. The method 300 can be exited.

Figure 4:
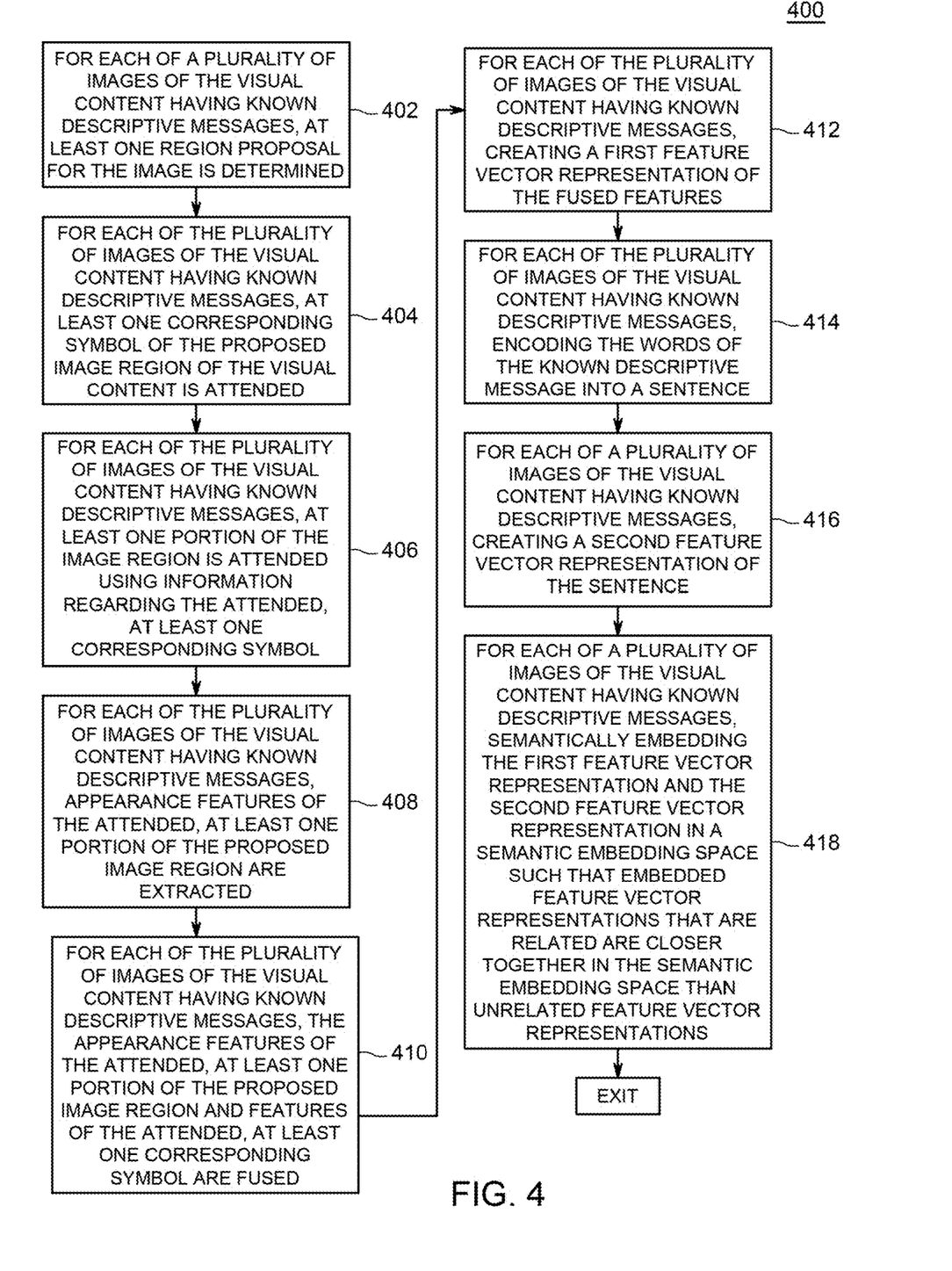
FIG. 4 depicts a flow diagram of a method for creating a semantic embedding space for understanding images of visual content in accordance with an embodiment of the present principles

FIG. 4 depicts a flow diagram of a method 400 for creating a semantic embedding space for determining a descriptive message for understanding images of visual content in accordance with an embodiment of the present principles. The method 400 begins at 402 during which, for each of a plurality of images of the visual content having known descriptive messages, determining at least one region proposal for the image. The method 400 can proceed to 404.

At 404, for each of the plurality of images of the visual content having known descriptive messages, attending at least one corresponding symbol of the proposed image region of the visual content. The method 400 can proceed to 406.

At 406, for each of the plurality of images of the visual content having known descriptive messages, attending at least one portion of the image region using information regarding the attended, at least one corresponding symbol. The method 400 can proceed to 408.

At 408, for each of the plurality of images of the visual content having known descriptive messages, extracting appearance features of the attended, at least one portion of the proposed image region. The method 400 can proceed to 410.

At 410, for each of the plurality of images of the visual content having known descriptive messages, fusing the appearance features of the attended, at least one portion of the proposed image region and features of the attended, at least one corresponding symbol. The method 400 can proceed to 412.

At 412, for each of the plurality of images of the visual content having known descriptive messages, creating a first feature vector representation of the fused features. The method 400 can proceed to 414.

At 414, for each of the plurality of images of the visual content having known descriptive messages, encoding the words of the known descriptive message into a sentence. The method 400 can proceed to 416.

At 416, for each of a plurality of images of the visual content having known descriptive messages, creating a second feature vector representation of the sentence. The method 400 can proceed to 418.

At 418, for each of a plurality of images of the visual content having known descriptive messages, semantically embedding the first feature vector representation and the second feature vector representation in a semantic embedding space such that embedded feature vector representations that are related are closer together in the semantic embedding space than unrelated feature vector representations. The method 400 can be exited.

Figure 5:
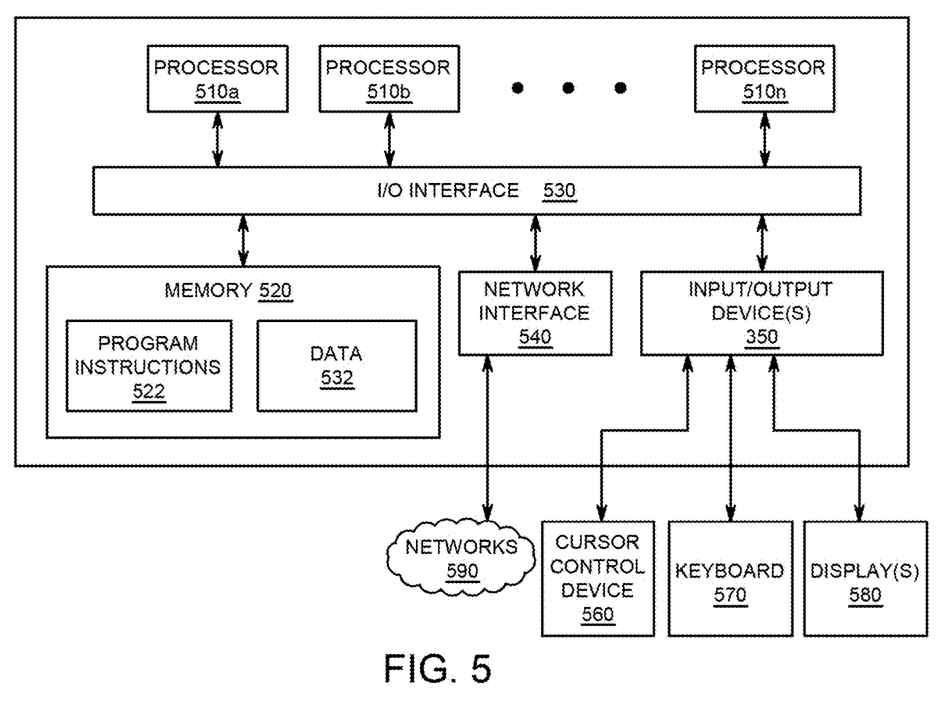
FIG. 5 depicts a high-level block diagram of a computing device for implementing a visual content understanding system in accordance with embodiments of the present principles.

FIG. 5 depicts a high-level block diagram of a computing device 500 for implementing embodiments of a visual content understanding system in accordance with embodiments of the present principles. In some embodiments computing device 500 can be configured to implement methods of the present principles, such as at least the method 300 and the method 400 as processor-executable executable program instructions 522 (e.g., program instructions executable by processor(s) 510) in various embodiments.

In the embodiment of FIG. 5, computing device 500 includes one or more processors 510a-510n coupled to a system memory 520 via an input/output (I/O) interface 530. Computing device 500 further includes a network interface 540 coupled to I/O interface 530, and one or more input/output devices 550, such as cursor control device 560, keyboard 570, and display(s) 580. In various embodiments, any of the components can be utilized by the system to receive user input described above. In various embodiments, a user interface can be generated and displayed on display 580. In some cases, it is contemplated that embodiments can be implemented using a single instance of computing device 500, while in other embodiments multiple such systems, or multiple nodes making up computing device 500, can be configured to host different portions or instances of various embodiments. For example, in one embodiment some elements can be implemented via one or more nodes of computing device 500 that are distinct from those nodes implementing other elements. In another example, multiple nodes may implement computing device 500 in a distributed manner.

In different embodiments, computing device 500 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 500 can be a uniprocessor system including one processor 510, or a multiprocessor system including several processors 510 (e.g., two, four, eight, or another suitable number). Processors 510 can be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 520. In other embodiments, program instructions and/or data can be received, sent or stored upon different types of computer-accessible media or on similar media separate from system memory 520 or computing device 500.

In one embodiment, I/O interface 530 can be configured to coordinate I/O traffic between processor 510, system memory 520, and any peripheral devices in the device, including network interface 540 or other peripheral interfaces, such as input/output devices 550. In some embodiments, I/O interface 530 can perform any necessary protocol, timing or other data transformations to convert data signals from one component (e.g., system memory 520) into a format suitable for use by another component (e.g., processor 510). In some embodiments, I/O interface 530 can include support for devices attached through various types of peripheral buses, such as a variant of the Peripheral Component Interconnect (PCI) bus standard or the Universal Serial Bus (USB) standard, for example. In some embodiments, the function of I/O interface 530 can be split into two or more separate components, such as a north bridge and a south bridge, for example. Also, in some embodiments some or all of the functionality of I/O interface 530, such as an interface to system memory 520, can be incorporated directly into processor 510.

Network interface 540 can be configured to allow data to be exchanged between computing device 500 and other devices attached to a network (e.g., network 590), such as one or more external systems or between nodes of computing device 500. In various embodiments, network 590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 can, in some embodiments, include one or more display terminals, keyboards, keypads, touchpads, scanning devices, voice or optical recognition devices, or any other devices suitable for entering or accessing data by one or more computer systems. Multiple input/output devices 550 can be present in computer system or can be distributed on various nodes of computing device 500. In some embodiments, similar input/output devices can be separate from computing device 500 and can interact with one or more nodes of computing device 500 through a wired or wireless connection, such as over network interface 540.

In some embodiments, the illustrated computing device 500 can implement any of the operations and methods described above, such as the methods illustrated by the flowcharts of FIG. 3 and FIG. 4. In other embodiments, different elements and data can be included.

Those skilled in the art will appreciate that computing device 500 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 500 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 500 can be transmitted to computing device 500 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

In one experiment, a task of visual ad understanding in accordance with the present principles is evaluated by matching ad images to corresponding candidate messages (e.g., human generated sentences). In the experiment, 50 statements (3 related and 47 unrelated from the same topic) were ranked. Embodiments of the present principles were evaluated on a subset of an ADs dataset, which have at least one symbol annotation that belongs to one of the 53 clusters of symbols. In the experiment, no distinction was made between the public service announcements (PSAs) and product ads and the two were combine them during evaluation. Specifically, during evaluation, the 50 statements were ranked for each image based on a similarity score and a mean of the top rank of the ground-truth statements for images (mean rank metric) were reported. The dataset consisted of 13,938 images partitioned into 5 cross-validation splits.

For implementation, the features for image(s) (and boxes) were pre-extracted using ResNet-101 as the base CNN and the top 70 EdgeBoxes for extracting object proposals. In the experiment, for learning, an Adam optimizer with a learning rate of $5e^{-4}$ was used.

Figure 6:
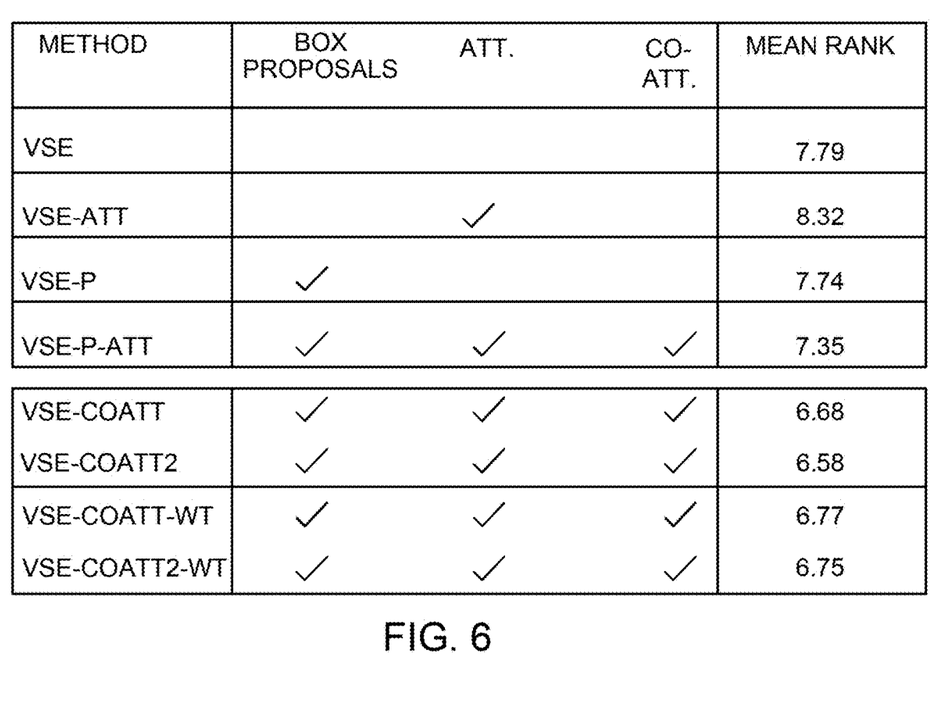
FIG. 6 depicts a Table including performance results of embodiments of a visual content understanding system in accordance with the present principles.

FIG. 6 depicts a Table including performance results of embodiments of a visual content understanding system in accordance with the present principles, such as the visual content understanding system 100 of FIG. 1 along different baselines. That is, in the table depicted in FIG. 6, the results of the content understanding system of the present principles is presented using different baselines to highlight some of the benefits of the proposed content understanding system in accordance with the present principles. That is, as depicted in the Table of FIG. 6, several baseline models were implemented in which the same features and learning settings were used for a fair comparison.

In the experiment, methods included Visual Semantic Embeddings (VSE) methods with attention (VSE-Att) and without attention (VSE). In addition, two variants of VSE with object proposals—first using average pooling (VSE-P) and second using attention over the proposals (VSE-P-Att) were implemented. In addition, in the experiment four variants that include co-attention (VSE-CoAtt), both co-attention and multi-hop (VSE-CoAtt-2), and two similar implementations (VSE-CoAtt-wt and VSE-CoAtt-2-wt) that weight the symbol initialization (i.e., in equation (1)) with symbol probabilities, $z_k$, were implemented.

As depicted in the Table of FIG. 6, the VSE-CoAtt2 method outperforms all the other methods. For example, in comparison to a 7.79 mean rank obtained by a baseline VSE, the VSE-CoAtt2 method achieves a lower mean rank of 6.58. In addition, the advantage of using co-attention in accordance with the present principles is evident in the performance of the VSE-CoAtt method having a rank of 6.68) versus the VSE-P-Att method having a rank of 7.35, which uses a fixed attention template for the visual modality. The benefit of using multi-hops in accordance with embodiments of the present principles that aggregate information from multiple steps of visual and symbol attention can be observed in the Table of FIG. 6 when comparing the mean rank of 6.68 of the VSE-CoAtt method versus the mean rank of 6.58 of the VSE-CoAtt-2 method. As depicted in the Table of FIG. 6, the results while using per-symbol probabilities for initializing iterations for attention is lower for both methods with and without multi-hop attention.

Embodiments in accordance with the present principles can be implemented for providing content recommendations and, more specifically as content recommenders. For example, in some embodiments an image (e.g., still frame) of visual content (e.g., advertising content) can be projected into a semantic embedding space in accordance with the present principles to determine a descriptive message (e.g., candidate message) relevant to the image of the visual content. Alternatively or in addition, in some embodiments in accordance with the present principles, a descriptive message can be projected into a semantic space in accordance with the present principles to determine content (e.g., visual features) that most visually convey the descriptive message.

The alignment of the symbols and objects in accordance with the present principles advantageously provides a finer grained definition of features of objects than previously available with state-of-the-art techniques. For example, a previous search of visual content for "a soccer player" using currently available search techniques and tools would be associated with images of a person with a ball or a goalpost. Because of the alignment of symbols and objects in accordance with the present principles, a search will return images of the person with a soccer ball. More specifically, in some embodiments the alignment of symbols and objects in accordance with the present principles generates better feature descriptions for content understanding.

Embodiments in accordance with the present principles can further be implemented to enhance services provided by content providers. For example, in some embodiments, a visual content understanding system in accordance with the present principles can be integrated into a web browser/search engine to provide more accurate search results.

Figure 8:
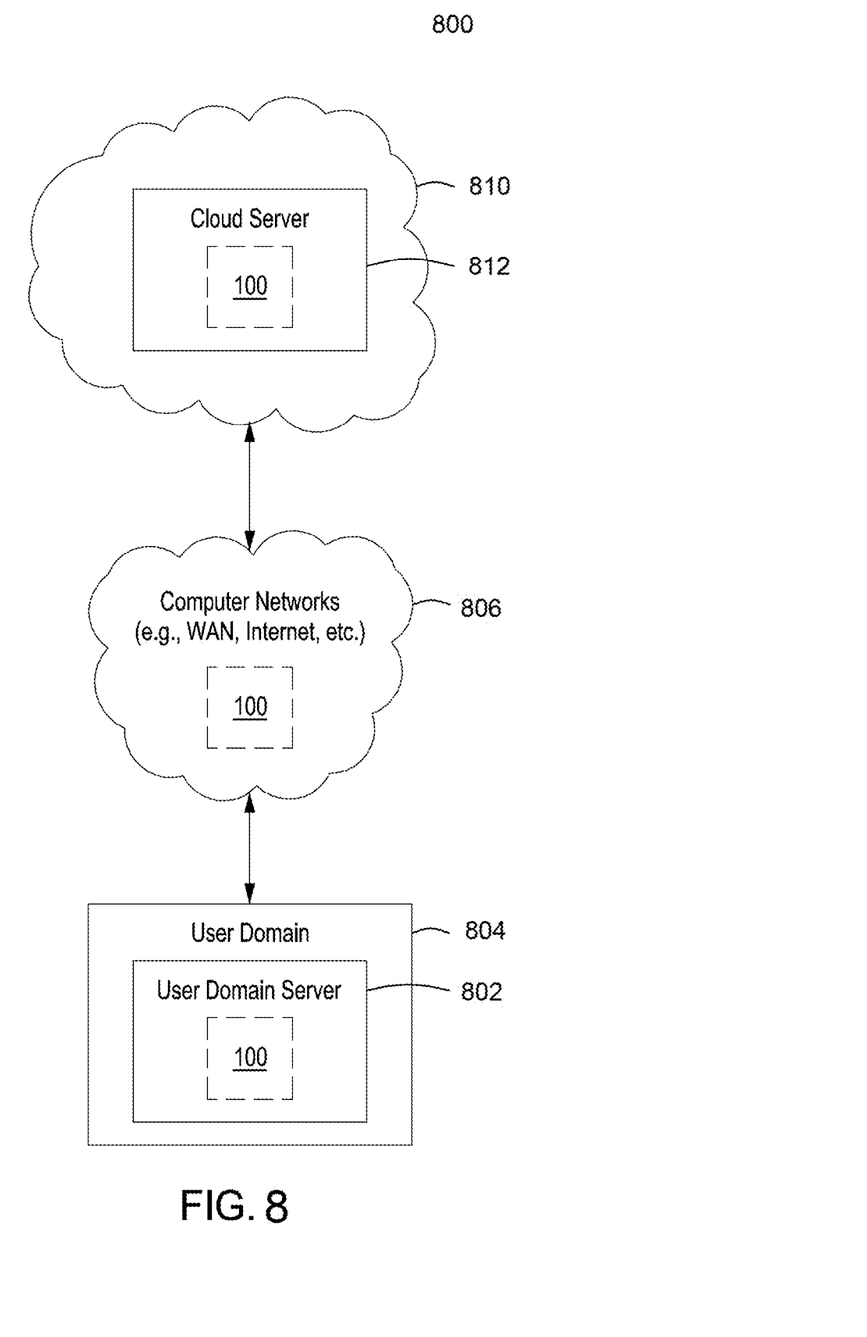
FIG. 8 depicts a high-level block diagram of a network in which embodiments of a visual content understanding system in accordance with the present principles can be applied.

FIG. 8 depicts a high-level block diagram of a network in which embodiments of a visual content understanding system in accordance with the present principles can be applied. The network environment 800 of FIG. 8 illustratively comprises a user domain 802 including a user domain server 804. The network environment 800 of FIG. 8 further comprises computer networks 806, and a cloud environment 810 including a cloud server 812.

In the network environment 800 of FIG. 8, a visual content understanding system in accordance with the present principles, such as the visual content understanding system 100 of FIG. 1, can be included in at least one of the user domain server 804, the computer networks 806 and the cloud server 812. For example, in some embodiments, a user can use a local server (e.g., the user domain server 804) to receive images/data and videos that can be used to train a semantic space in accordance with the present principles and on which visual content understanding is to be performed. In such an embodiment, the images/data and videos received at the local server can be communicated to a remote server (e.g., at least one of the computer networks 806 and the cloud server 812) at which a semantic space can be trained. Alternatively or in addition, in some embodiments a semantic space can be trained completely at the remote server and images received at a local server can be communicated to a remote server at which contend understanding in accordance with the present principles can be implemented, for example, in a content understanding system in accordance with the present principles.

That is, in some embodiments, a user can implement a visual content understanding system in the computer networks 806 to provide images/data and videos that can be used to train a semantic space in accordance with the present principles and on which visual content understanding is to be performed in accordance with the present principles. Alternatively or in addition, in some embodiments, a user can implement a visual content understanding system in the cloud server 812 of the cloud environment 810 to provide images/data and videos that can be used to train a semantic space in accordance with the present principles and on which visual content understanding is to be performed in accordance with the present principles. For example, in some embodiments it can be advantageous to perform processing functions of the present principles in the cloud environment 810 to take advantage of the processing capabilities of the cloud environment 810. In some embodiments in accordance with the present principles, a visual content understanding system can be located in a single or multiple locations/servers/computers to perform all or portions of the herein described functionalities of a visual content understanding system in accordance with the present principles.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for understanding visual content, comprising:
    determining at least one region proposal for an image of the visual content;
    attending at least one corresponding symbol of the proposed image region of the visual content;
    attending at least one image portion of the proposed image region using information regarding the attended, at least one corresponding symbol;
    extracting visual features of the attended, at least one portion of the proposed image region using a neural network;
    fusing the visual features of the attended, at least one portion of the proposed image region and features of the attended, at least one corresponding symbol;
    projecting the fused features into a semantic embedding space having been trained using fused attended visual features and attended symbol features of images having known descriptive messages;
    computing a similarity measure between the projected, fused features and fused attended visual features and attended symbol features embedded in the semantic embedding space having at least one associated descriptive message; and
    predicting a descriptive message for an image associated with the projected, fused features by determining a nearest embedded, fused attended visual features and attended symbol features to the projected, fused features of the image in the semantic embedding space based on the similarity measures computed for the projected, fused features of the image.

2. The method of claim 1, wherein fusing the visual features of the attended, at least one portion of the proposed image region and the features of the attended, at least one corresponding symbol comprises:
    determining a summary vector for the extracted visual features;
    determining a summary vector for the symbol features; and
    fusing the summary vector of the extracted visual features and the summary vector of the symbol features.

3. The method of claim 2, wherein determining the summary vector for the visual features comprises normalizing attention scores calculated for the visual features using an initialized summary vector for the symbol features, and wherein determining the summary vector for the symbol features comprises normalizing attention scores calculated for the symbol features using a previously determined summary vector for the visual features.

4. The method of claim 1, wherein attending a symbol of the proposed image region and attending at least one image portion of the proposed image region for each proposed image region is performed in a multi-hop iteration process comprising using at least one of symbol attention information and image portion attention information from a previous iteration as input for attending at least one image portion and symbol in a subsequent iteration.

5. The method of claim 1, wherein visual features and symbol features are extracted using at least one neural network.

6. The method of claim 5, wherein the at least one neural network comprises at least one of a convolutional neural network or a recurrent neural network.

7. The method of claim 1, further comprising assigning a score for each of the symbol features.

8. The method of claim 7, wherein the score is based on at least one of information input by a user or information predicted using a neural network.

9. The method of claim 1, wherein the symbol comprises at least one of text and audio.

10. A method for creating a semantic embedding space for determining a descriptive message for understanding images of visual content, comprising:
    for each of a plurality of images of the visual content having at least one respective, known descriptive message;
    determining at least one region proposal for the image, and for each of the proposed image regions;
        attending at least one corresponding symbol of the proposed image region of the visual content;
        attending at least one portion of the image region using information regarding the attended, at least one corresponding symbol;
        extracting appearance features of the attended, at least one portion of the proposed image region;
        fusing the appearance features of the attended, at least one portion of the proposed image region and features of the attended, at least one corresponding symbol; and
        creating a first feature vector representation of the fused features;
    encoding words of the known descriptive message into a sentence;
    creating a second feature vector representation of the sentence; and
    semantically embedding the first feature vector representation and the second feature vector representation in a semantic embedding space such that embedded feature vector representations that are related are closer together in the semantic embedding space than unrelated feature vector representations.

11. The method of claim 10, wherein the semantic embedding space is created using a max-margin based triplet ranking loss function.

12. An apparatus for visual content understanding of an image, comprising:
    a region proposal module determining at least one region proposal for an image of the visual content;
    an attention module attending at least one corresponding symbol of the proposed image region of the visual content and attending at least one portion of the proposed image region using information regarding the attended, at least one corresponding symbol;
    a feature detection module extracting appearance features of the attended, at least one portion of the proposed image region using a neural network;
    a modality fusion module fusing the appearance features of the attended, at least one portion of the proposed image region and features of the attended, at least one corresponding symbol;
    an embedding module projecting the fused features into a semantic embedding space having been trained using fused attended appearance features and attended symbol features of images having known descriptive messages;
    computing a similarity measure between the projected, fused features and fused attended appearance features and attended symbol features embedded in the semantic embedding space having at least one associated descriptive message;

predicting a descriptive message for an image associated with the projected, fused features by determining a nearest embedded, fused attended appearance features and attended symbol features to the projected, fused features of the image in the semantic embedding space based on the similarity measures computed for the projected, fused features of the image.

13. The apparatus of claim 12, wherein for fusing the visual features of the attended, at least one portion of the proposed image region and the features of the attended, at least one corresponding symbol, the modality fusion module is configured to:
- determine a summary vector for the extracted visual features;
- determine a summary vector for the symbol features; and
- fuse the summary vector of the extracted visual features and the summary vector of the symbol features.

14. The apparatus of claim 13, wherein for determining the summary vector for the visual features, the modality fusion module is configured to normalize attention scores calculated for the visual features using an initialized summary vector for the symbol features, and wherein for determining the summary vector for the symbol features the modality fusion module is configured to normalize attention scores calculated for the symbol features using a previously determined summary vector for the visual features.

15. The apparatus of claim 12, wherein attending a symbol of the proposed image region and attending at least one image portion of the proposed image region for each proposed image region is performed by the attention module using a multi-hop iteration process comprising using at least one of symbol attention information and image portion attention information from a previous iteration as input for attending at least one image portion and symbol in a subsequent iteration.

16. The apparatus of claim 12, wherein the feature detection module extracts the visual features and the symbol features using at least one neural network.

17. The apparatus of claim 16, wherein the at least one neural network comprises at least one convolutional neural network.

18. The apparatus of claim 12, the feature detection module assigns a score for each of the symbol features.

19. The apparatus of claim 18, wherein the score is based on at least one of information input by a user or predicted using a neural network.

20. The apparatus of claim 12, wherein the symbol comprises at least one of text and audio.

\* \* \* \* \*